United States Patent [19]

Kawamoto

[11] Patent Number: 4,476,747
[45] Date of Patent: Oct. 16, 1984

[54] TIMING CONTROL VALVE IN AUTOMATIC TRANSMISSION CONTROL APPARATUS

[75] Inventor: Mutsumi Kawamoto, Nagoya, Japan

[73] Assignee: Aisin Warner Kabushiki Kaisha, Aichi, Japan

[21] Appl. No.: 229,568

[22] PCT Filed: May 8, 1980

[86] PCT No.: PCT/JP80/00097

§ 371 Date: Jan. 9, 1981

§ 102(e) Date: Jan. 9, 1981

[30] Foreign Application Priority Data

May 10, 1979 [JP] Japan .................................. 54-57735

[51] Int. Cl.³ .............................................. B60K 41/16
[52] U.S. Cl. ........................................ 74/869; 74/861; 74/856; 74/868
[58] Field of Search ................. 74/869, 868, 867, 865, 74/861, 856, 752 C

[56] References Cited

U.S. PATENT DOCUMENTS

| | | | |
|---|---|---|---|
| 3,747,439 | 7/1973 | Uozumi | 74/869 |
| 3,792,763 | 2/1974 | Enomoto | 74/869 |
| 3,938,409 | 2/1978 | Uozumi | 74/869 |
| 4,106,369 | 8/1978 | Taga | 74/869 |
| 4,161,895 | 7/1979 | Ushijuma | 74/869 |
| 4,313,354 | 2/1982 | Iwanaga | 74/869 |
| 4,334,441 | 6/1982 | Iwanaga | 74/869 |

FOREIGN PATENT DOCUMENTS

| | | | |
|---|---|---|---|
| 2321352 | 11/1974 | Fed. Rep. of Germany | 74/868 |
| 1267423 | 3/1972 | United Kingdom | 74/869 |
| 1267424 | 3/1972 | United Kingdom | 74/869 |
| 1408628 | 10/1975 | United Kingdom | 74/869 |

*Primary Examiner*—Allan D. Herrmann
*Assistant Examiner*—D. Wright
*Attorney, Agent, or Firm*—Oblon, Fisher, Spivak, McClelland & Maier

[57] ABSTRACT

A timing control valve for use in the automatic transmission control apparatus for vehicles has a spring-backed spool which is actuated for movement to one position by the spring force or the spring force and the oil pressure to be applied to the brake $B_2$ for causing a sun gear and a transmission gear case to be engaged by way of a one-way clutch, and is actuated for movement to the other side by a counteracting force provided by a line pressure and an oil pressure to be applied to the reverse clutch $C_2$, whereby the timing control valve permits the brake $B_1$ to be operated for directly connecting or disconnecting the sun gear and transmission case by controlling the timing of such operation of the brake $B_1$ in response to changes in the throttle opening degree, and particularly permit a smooth downshifting without a one-way clutch.

20 Claims, 6 Drawing Figures ns to lower speed shift range are engaged and or released at appropriate timings. However, in order to permit a smooth downshifting, intervals or timing lags between those timings should desirably tend properly to increase with an increasing engine speed or with increase in throttle opening degree which is in correlation with the engine speed. It has been known that to properly increase those timing lags is particularly important in clutch-to-clutch downshifting without the aid of an intermediate one-way clutch.

TIMING CONTROL VALVE IN AUTOMATIC TRANSMISSION CONTROL APPARATUS

BACKGROUND OF THE INVENTION

1. Field of the Invention

The present invention relates to a timing control valve for use in the automatic transmission control apparatus for vehicles, which is provided in the hydraulic control circuit for controlling the operation timing of brakes, clutches, etc. in the transmission unit so that they can be operated at appropriate timings at each shifting.

2. Description of the Prior Art

When a shifting from a higher speed gear ratio to a lower speed gear ratio (downshifting) takes place, brakes, clutches or one-way clutch on the one hand, which are being engaged in a higher speed gear ratio ("shift range" or "speed" hereinafter) and are to be disengaged or released in a lower speed shift range, and brakes, clutches or one-way clutch on the other hand, which are being released in the higher speed shift range and are to be engaged in the lower speed shift range are engaged and or released at appropriate timings. However, in order to permit a smooth downshifting, intervals or timing lags between those timings should desirably tend properly to increase with an increasing engine speed or with increase in throttle opening degree which is in correlation with the engine speed. It has been known that to properly increase those timing lags is particularly important in clutch-to-clutch downshifting without the aid of an intermediate one-way clutch.

A conventional timing valve as shown in FIG. 1 which provides timing lag control functions as described above. The timing valve shown in FIG. 1 is actuated by a spring 52 backing one side of the spool 51, and by a thereagainst counteracting operating oil pressure $PC_2$ from a hydraulic servo unit applied on a piston portion 53 of the spool 51. The pressure $PC_2$ causes the clutch $C_2$ to be engaged in a higher speed shift range and to be disengaged in a lower speed shift range, so that the timing valve controls oil pressure supply to the brake $B_1$ permitting the brake $B_1$ to be engaged after a certain timing lag or delay when a downshifting to the lower speed shift range takes place. As the operating hydraulic (oil) pressure $PC_2$, which is proportional to a line pressure PL introduced into a hydraulic circuit through a pressure regulating valve for regulating an output pressure of an oil pump driven by the engine, rises in accordance with increase in the engine speed or throttle opening degree, the operating oil pressure $PC_2$ which lies at an elevated state will take a longer time before being wholly exhausted, thus allowing an increased timing lag between releasing step of the clutch $C_2$ and subsequent engaging step of the brake $B_1$. However, according to the conventional timing valve, it is impossible to provide a sufficient timing lag change to meet the required timing lag corresponding to the increase in the throttle opening degree.

SUMMARY OF THE INVENTION

A principal object of the present invention is to provide a timing valve for use in the automatic transmission control apparatus permitting proper increase in the timing lag at which the clutches, brakes and other elements can be operated on shifting to a lower speed shift range, in response to increase in the throttle opening degree, etc., and therefore permitting a smooth downshifting.

The invention includes a timing control valve for use in an automatic transmission control apparatus of a type in which a shifting to one shift range is effectuated essentially by engaging a brake $B_1$ for operating engine brake or aiding in operating of a one-way clutch, and by engaging a clutch $C_1$. The timing control valve functions in such a manner that a shifting from a higher speed shift range to said one shift range is effectuated by causing the brake $B_1$ to be engaged after releasing a clutch $C_2$ which has been in engagement at the higher speed shift range and causing the one-way clutch to be engaged if this is provided. The present invention provides a timing control valve which as essential elements comprises a spool backed with a spring on one side thereof, and a hydraulic line pressure medium and a hydraulic servo pressure medium to be applied to a clutch $C_2$ which are exerted on respective piston portions of the spool with each specified pressure-applicable area counteracting against the spring force. The spool is thereby actuated to control, i.e., to supply or release a hydraulic pressure which is applied to the brake $B_1$.

DESCRIPTION OF THE PREFERRED EMBODIMENTS

One preferred embodiment of the present invention is now described in more detail with reference to from FIG. 2 to FIG. 6.

Figure 1:
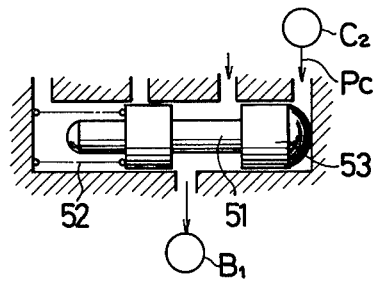
FIG. 1 is a schematic view of a conventional timing control valve arrangement.
Figure 2:
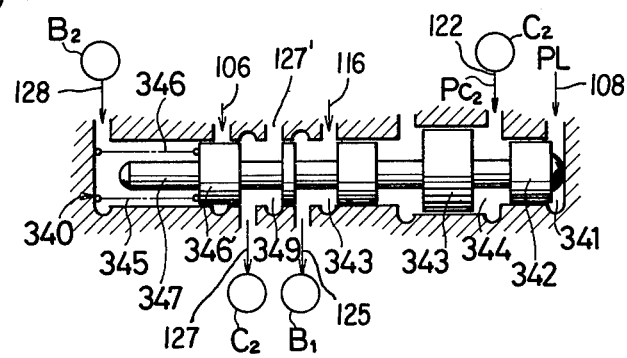
FIG. 2 is a schematic view of a timing control valve arrangement according to the present invention.

FIG. 2 shows an embodiment of the timing control valve according to the invention, generally shown by 340, the arrangement comprising on the right side a fluid ("oil" hereinafter) chamber 341 in which a line pressure PL is introduced and a piston portion ("land" hereinafter) 342 of a pressure-applicable area $A_1$ whereon the line pressure PL is to be applied; and on the left side an oil chamber 344 which is communicated to an inner piston I of a clutch $C_2$ which in this embodiment is engaged in the third speed shift range ("speed" hereinafter) and is to be released in the second speed and a land 342 of a greater applicable area $A_2$ than that of the land 343 to which the operating oil pressure $PC_2$ is to be applied for operating the inner piston I. The valve arrangement 340 further has an oil chamber 346 communicated to the brake $B_2$ which operates the one-way clutch $F_1$ so arranged in this embodiment, as to be operated in the second speed; a spool 347 arranged in a oil chamber 346 as well as defining said oil chamber and having the land 346' to which the operating oil pressure $PB_2$ for the brake $B_2$ is applied; a spring 345 biasing the spool 347 by exerting a resilience force Fs, an oil chamber 348 from which an oil pressure is supplied to the brake $B_1$ for effectuating an engine brake according to the movement of the spool 347 in the second speed when the manual shift valve is placed in a D range and a 2 range; and an oil chamber 349 from which oil pressure is supplied to the outer piston O which cooperates with the inner piston I to actuate the clutch $C_2$ into its engagement when, in this embodiment, a shifting to reverse is effected.

The operation of the above described timing control valve will be described.

Figure 4:
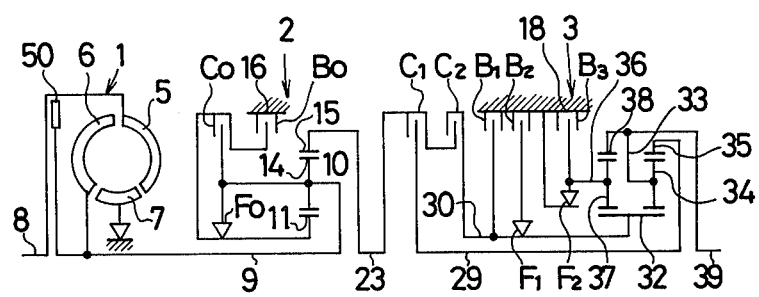
FIG. 4 is a schematic diagram of an automatic transmission controlled by the hydraulic circuit of FIG. 3.
Figure 3:
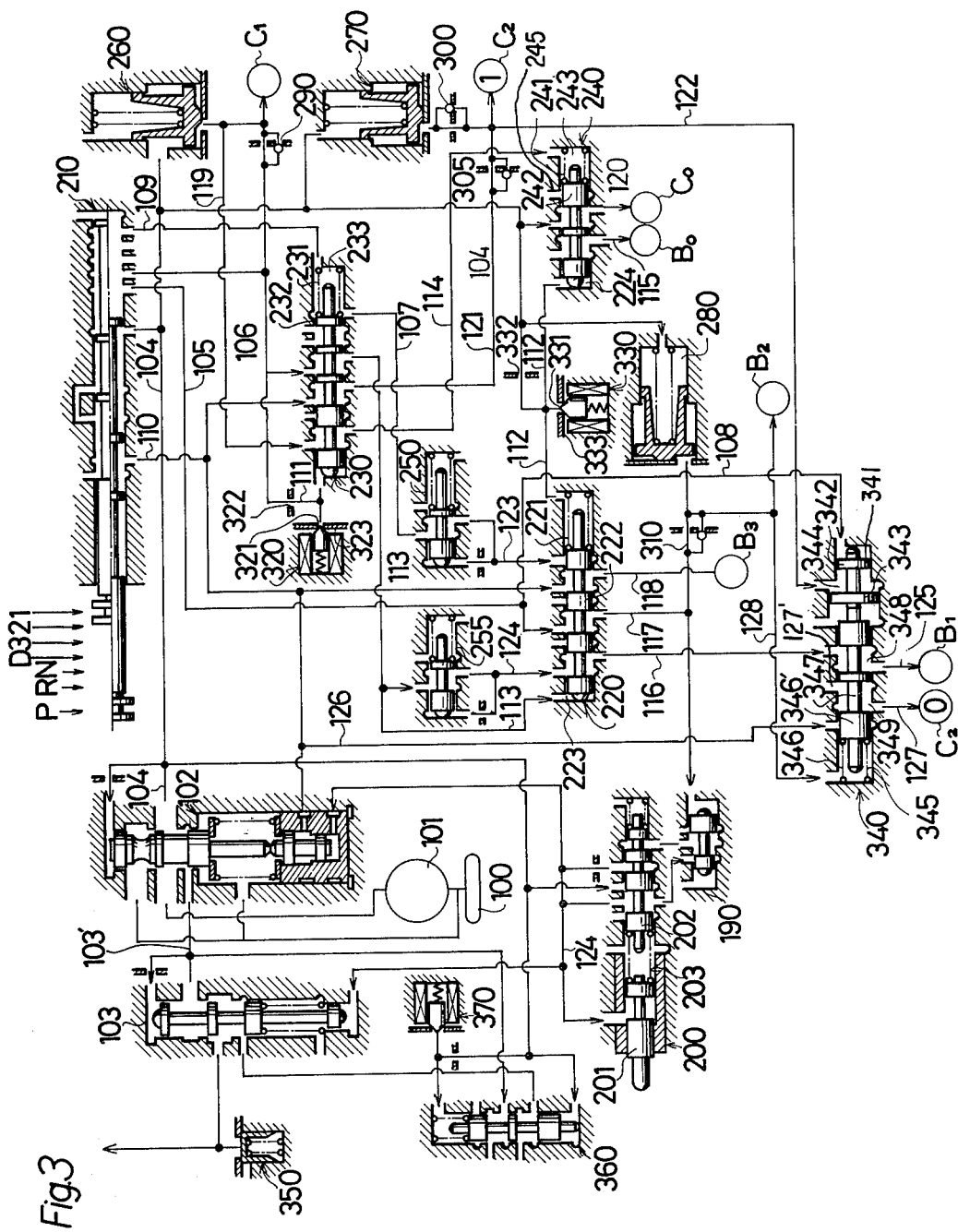
FIG. 3 is a diagram of a hydraulic circuit incorporating the timing control valve according to the present invention.

FIG. 3 is a diagram of an example of the hydraulic circuit in the automatic transmission control apparatus, in which the timing control valve is provided, the hydraulic circuit operating a hydrodynamic automatic transmission including an overdrive unit as shown in FIG. 4. The automatic transmission includes a torque converter 1 with a direct-coupling clutch 50, an overdrive unit 2 and a transmission gear unit 3 which provides three forward speeds and one reverse. The torque converter 1, which is known per se, comprises a pump 5, a turbine 6 and a stator 7, the pump 5 being connected to an engine crankshaft 8, and the turbine 6 being connected to a turbine shaft 9. The turbine shaft 9 provides an output shaft for the torque converter 1 and also provides an input shaft for the overdrive unit 2. The turbine shaft 9 is connected to a carrier 10 of a planetary gear set for the overdrive unit 2. The direct-coupling clutch 50 is interposed between the engine crankshaft 8 and turbine shaft 9, and is actuated to mechanically connecting the crankshaft 8 with the turbine shaft 9. A planetary pinion (or a set of pinions) 14 rotatably supported by the carrier 10 engages a sun gear 11 and a ring gear 15. An overdrive multi-disc clutch $C_0$ and an overdrive one-way clutch $F_0$ are interposed between the sun gear 11 and the carrier 10, and an overdrive multi-disc brake $B_0$ is interposed between the sun gear 11 and a housing or overdrive casing 16 which accommodates the overdrive unit.

The ring gear 15 in the overdrive unit is connected to an input shaft 23 of the transmission gear unit 3. A front multi-disc clutch $C_1$ is provided between the input shaft 23 and shaft 29, with a reverse multi-plate clutch $C_2$ disposed between the input shaft 23 and sun gear shaft 30. A multi-disc brake $B_1$ and a multi-disc brake $B_2$ which is operable through a one-way clutch $F_1$ are provided between the sun gear shaft 30 and transmission case 18. A sun gear 32 fixed on the sun gear shaft 30 forms a planetary gear train composed of two planetary gear sets, one set including a carrier 33, a planetary pinion 34 carried by the carrier 33 and a ring gear 35 in mesh with the pinion 34, and the other set including a carrier 36, a planetary pinion 37 carried by the carrier 36 and a ring gear 38 in mesh with the pinion. The ring gear 35 in one of the planetary gear sets is connected to the shaft 29. The carrier 33 in this gear set is linked to the ring gear 38 in the other gear set, the carrier 33 and the ring gear 38 being connected to the output shaft 39. A multi-disc brake $B_3$ and a one-way clutch $F_2$ are provided between the carrier 36 in the other gear set and the transmission case 18.

The hydrodynamic automatic transmission hereinabove described is controlled by the hydraulic control circuit which will later be described wherein each clutch and brake can be engaged or disengaged according to the engine output changes and cruising speeds of the automobile, thus providing the corresponding shift ranges (or speeds) of four forward speeds including an overdrive speed (O/D) or a manually switched shifting to a reverse gear.

Transmission gear positions and brake operations are shown in Table 1.

TABLE 1

| Shift positions | Friction engagement elements | | | | | | | | | |
|---|---|---|---|---|---|---|---|---|---|---|
| | clutch $C_0$ | clutch $C_1$ | clutch $C_2$ | brake $B_0$ | brake $B_1$ | brake $B_3$ | brake $B_2$ | one-way clutch $F_0$ | one-way clutch $F_2$ | one-way clutch $F_1$ |
| Parking (P) | O | X | X | X | X | O | X | | | |
| Reverse (R) | O | X | O | X | X | O | X | lock | lock | |
| Neutral (N) | O | X | X | X | X | X | X | | | |
| Forward | | | | | | | | | | |
| D range | | | | | | | | | | |
| 1st | O | O | X | X | X | X | X | lock | lock | over-run |
| 2nd | O | O | X | X | O | X | O | lock | over-run | lock |
| 3rd | O | O | O | X | X | X | O | lock | over-run | over-run |
| O.D | X | O | O | O | X | X | O | over-run | over-run | over-run |
| 3 range | | | | | | | | | | |
| 1st | O | O | X | X | X | X | X | lock | lock | over-run |
| 2nd | O | O | X | X | X | X | O | lock | over-run | lock |
| 3rd | O | O | O | X | X | X | O | lock | over-run | over-run |
| 2 range | | | | | | | | | | |
| 1st | O | O | X | X | X | X | X | lock | lock | over-run |
| 2nd | O | O | X | X | O | X | O | lock | over-run | lock |
| L range | O | O | X | X | X | O | X | lock | lock | over-run |

In the above table, a symbol "O" indicates that the appropriate clutch or brake is engaged, and a symbol "X" indicates that the appropriate clutch or brake is disengaged.

FIG. 3 illustrates a preferred embodiment of the fluid circuit in the hydraulic control apparatus according to the present invention, which permits an automatic or manual shifting of gears by selectively operating the clutches $C_0$, $C_1$, $C_2$ and brakes $B_0$, $B_1$, $B_2$, $B_3$ of the automatic transmission, and the direct-coupling clutch 50 of the torque converter. In FIG. 3, the fluid circuit comprises an oil tank 100, an oil pump 101, a pressure regulating valve 102, an auxiliary pressure regulating valve 103, a cutback valve 190, a throttle valve 200, a manual valve 210, a 1-2 shift valve 220, a 2-3 shift valve 230, a 3-4 shift valve 240, a low coast modulator valve 250, an intermediate coast modulator valve 255, accumulator valves 260, 270, 280, check valve-incorporated flow control valves 290, 300, 305, 310, solenoid valve 320, 330, a timing valve according to the present invention 340, a cooler bypass valve 350, a direct coupling clutch control valve 360, a direct coupling control solenoid valve 370, oil passages between the above-mentioned valves and passages for supplying pressure oil to fluid servo elements of the clutches and brakes from the valves.

Operating oil which is drawn by the oil pump 101 from the oil tank 100 is introduced into the pressure regulating valve 102, which regulates oil to a predetermined pressure (line pressure), the regulated oil being branched into an oil pasaage 104 and an oil passage 103'. The oil through the passage 103' is introduced into the auxiliary pressure regulating valve 103 providing torque converter pressure, lubricating pressure and cooler pressure which are regulated to predetermined values depending on throttle pressures of the throttle valve 200. The manual valve 210 connected to the oil passage 104 is operatively associated with a shift lever located at a driver seat. Manually operating the shift lever brings the manual valve 210 to positions P, R, N, D, 3, 2 and L depending on the range positions in the shift lever. Table 2 summarizes the relationships between oil passage 104 and oil passages 105, 106, 109, 110 at each of the shift lever positions, the symbol "O" meaning that the oil passage communicates with the appropriate oil passages.

TABLE 2

|  | P | R | N | D | 3 | 2 | L |
|---|---|---|---|---|---|---|---|
| oil passage 105 |  |  |  | O | O | O | O |
| oil passage 106 |  |  |  | O | O | O | O |
| oil passage 109 |  |  |  |  |  |  | O |
| oil passage 110 |  | O |  |  |  |  |  |

The first solenoid valve 320 controlling the 2-3 shift valve 230 has its port 321 closed when it is not energized, causing oil to be pressurized in an oil passage 111 communicated with the oil passage 106 through an orifice 322. Energizing the valve 320 causes its port 321 to open, allowing the pressurized oil in the passage 111 to be drained through a drain port 323. The second solenoid valve 330 which controls the 1-2 shift valve 220 and 3-4 shift valve 240 has its port 331 closed when it is not energized, causing oil to be pressurized in an oil passage 112 communicated with the oil passage 104 through an orifice 332. Energizing the solenoid valve 330 causes its port 331 to open, allowing the pressurized oil in the passage 112 to be drained from a drain port 333. Table 3 shows the relationships between the solenoid status of the solenoid valves 320 and 330 which are energized or disenergized under control of an electronics circuit later to be described, and the corresponding shifting to four speeds and neutral in the automatic transmission.

TABLE 3

| Manual valve shift position Gear shift range | N range | D range | | | |
|---|---|---|---|---|---|
|  |  | 1st speed | 2nd speed | 3rd speed | 4th speed |
| 1st solenoid valve | OFF | ON | ON | OFF | OFF |
| 2nd solenoid valve | OFF | ON | OFF | OFF | ON |

The 1-2 shift valve 220 has a spool 222 backed with a spring 221, and since in the first speed of the gear shift range the solenoid valve 330 is being energized allowing oil pressure to be released from the oil passage 112, the spool 222 is set to the right position in the figure due to the oil pressure supplied through an oil passage 113 to an oil chamber 223 at the left end. In the second speed, the solenoid valve 330 is disenergized, providing the oil pressure in the oil passage 112, which sets the spool 222 to the left position in the figure. In the third and fourth speeds, the spool 232 in the 2-3 shift valve 230, which will be described later, is set to the right position in the figure, causing the oil pressure to be released from the left end oil chamber through the oil passage 113, which results in setting the spool 222 to the left position.

The 2-3 shift valve 230 has a spool 232 backed by a spring 231. In first and second speeds, the solenoid valve 320 is energized with no oil pressure in the oil passage 111, causing the spring 231 to move the spool 232 to the left position. In the third and fourth speeds, the solenoid valve 320 is disenergized, producing oil pressure in the passage 111, which sets the spool 232 to the right position.

The 3-4 shift valve 240 has a spool 242 backed by a spring 241 on one side thereof, and in first and second speeds, a line pressure is drawn into an oil chamber 243 through an oil passage 114, setting the spool 242 to the left position. In the third and fourth speeds, the oil pressure is released from the oil pressure 114; in the third speed, the solenoid valve 330 is energized allowing the passage 112 to be released with the pressure, and causing the spring 241 to urge the spool 242 toward the left setting position; and in the fourth speed, the solenoid valve 330 is disenergized producing the oil pressure in the passage 112, setting the spool 242 to the right position in the figure.

The throttle valve 200 is actuated in response to the stroke of the accelerator pedal depressed, causing a corresponding stroke in an indicator valve 201, which in turn compresses a spring 203 interposed between the indicator valve 201 and a valve spool 202, producing a throttle pressure in an oil passage 124.

With the manual valve 210 at N position, the solenoid valve 330 is disenergized and there is oil pressure in the oil passage 112, introducing oil pressure into left-end oil chamber 224 of the 3-4 shift valve 240 whose spool 242 is set to the right position. In this state, the 3-4 shift valve 240 allows a communication between oil passages 104 and 115, and the brake $B_0$ is engaged; the oil passage 120 is communicated to the drain port 245 from which the oil pressure is released, and the clutch $C_0$ is released; thus the overdrive unit 3 is with its overdrive gears in mesh.

Manually shifting the manual valve 210 to R position produces oil pressure in the oil passage 110, introducing the oil pressure into the right oil chamber 243 of the 3-4 shift valve 240 by way of the 2-3 shift valve 230 with its spool 232 set to the left position and through the oil passage 114. Thus, when the manual valve 210 is changed from N- to R position, the overdrive gears in the overdrive unit 2 are kept in mesh for about one second, and the reverse gears in the change (planetary) gear train 3 come to engagement. One second after the shifting from N to R, the oil chamber 243 receives a rising oil pressure, moving the spool 242 to the left position to allow the oil pressure 104 to communicate with the oil passage 120 which introduces the oil pressure to the clutch $C_0$ simultaneously releasing oil pressure from the oil passage 115, so that the brake $B_0$ is released and the clutch $C_0$ is engaged. The gears in the overdrive unit 2 are thus in a direct-coupled condition, and the planetary gear train is thus brought to a normal reverse gearing.

In case where the multi-disc clutch $C_2$ for reverse which is arranged in the change gear train 3 of the automatic transmission is provided with an inner piston I and an outer piston O as a hydraulic servo unit, it is necessary to produce a timing lag (or timing interval) between operations of both pistons in order to secure smooth gear engagement at reverse. Therefore, a passage 126 branched from the passage 110 is provided which is communicated via the timing valve 340 to the passage 127 which leads to the outer piston O of the clutch $C_2$. In this arrangement, the timing valve 340 with its spool 347 set at the left side actuates the outer piston O by communicating the passage 126 with the passage 127, whereas with its spool 347 set at the right side the timing valve 340 retains the outer piston O in a nonactuated state through communicating the passage 127 to an exhaust port 127'. When in this arrangement a manual shifting from N- to R position is performed, the oil pressure is first supplied via the passage 110, the 2-3 shift valve 230, the passage 121 and the flow control valve 305 to the inner piston I, then the oil pressure is supplied to the oil chamber 344 of the timing valve 340 via the passage 122. The spool 347 of the timing valve 340 is thus urged to move to the left in response to the pressure rise, whereby passages 126 and 127 are communicated with each other to actuate the outer piston O of the clutch $C_2$.

Now, in case where the N-D shifting is manually operated, in the first speed, a spool 222 in the 1-2 shift valve 220 is placed in the right position, releasing the oil pressure from oil passages 116 and 117 communicated to the brakes $B_1$ and $B_2$ and releasing the oil pressure from an oil passage 118 communicated to the brake $B_3$ so that the brakes $B_1$, $B_2$ and $B_3$ are released.

In the first speed, the timing control valve 340 receives the line pressure in its right oil chamber 341 which is provided through an oil passage 108 as a branch of the oil passage 105, the line pressure causing the spring 345 backing the spool 347 to be compressed to move the spool 347 to the left position.

When the car reaches a preset speed, the output signal from the computer circuit disenergizes the solenoid valve 330, moving the spool 222 in the 1-2 shift valve 220 to the left position to allow the line pressure supplied from oil passages 105 and 117 to gradually engage the brake $B_2$ through the flow control valve 310 and the accumulator valve 280, the line pressure being also introduced through the oil passage 128 into the left oil chamber 346 of the timing control valve 340. The sum of the force of the spring 345 and the gradually increasing oil pressure in the oil chamber 346 reaches a value greater than the line pressure on the land 342, at which time the spool 347 begins to be moved toward the right. After a preset period of time (timing lag) elapses, the spool 347 reaches the right position. As the first solenoid valve 320 is being energized (see Table 3) to place the spool 232 in the 2-3 shift valve 230 in the left position, the oil pressure is introduced into the brake $B_1$ through the route of the oil passage 106→2-3 shift valve 230→oil passage 113→intermediate coast modulator valve 255→oil passage 124→1-2 shift valve 220→oil passage 166→timing control valve 340→oil passage 125, causing the brake $B_1$ to be actuated. This causes a shifting to the second speed in which the engine brake is capable of working. At this time, the timing control valve 340 provides a timing control which permits the brake $B_1$ to be actuated after the transmission is shifted to the second speed and synchronized thereto due to engagement of the brake $B_2$.

Shifting to the third speed is accomplished in the following manner: the output provided by the computer circuit in response to a certain throttle position and vehicle speed disenergizes the solenoid valve 320, moving the spool 232 in the 2-3 shift valve 230 to the right position to allow the oil pressure to be supplied through the oil passages 106 and 121 and the flow control valve 305 to the clutch $C_2$ for effecting engagement, while simultaneously releasing the oil pressure from the oil chamber 223, which causes the spring 221 to lock the spool 222 of the 1-2 shift valve 220 in the left position.

In this third speed, the oil chamber 344 in the timing control valve 340, which is defined by the land 342 and the land 343 of a predetermined diameter greater than the land 342, receives the oil pressure introduced from the oil passage 122 branched from the oil passage 121 so that the spool 347 can be moved to the left position, allowing the oil passage 125 to communicate with the drain port 127', thus releasing the oil pressure resulting in releasing the brake $B_1$.

Shifting to the fourth speed is effected in a manner wherein the output provided by the computer circuit as above disenergizes the solenoid valve 330, causing the spool 242 in the 3-4 shift valve 240 to move to the right position to allow the oil pressure to be released from the oil passage 120 with the oil pressure introduced into the oil passage 115, releasing the clutch $C_0$ and engaging the brake $B_0$.

The shifting from the fourth to third speed is accomplished in the reverse sequence to that in which the above shifting from the third to fourth speed is done. The downshifting is effected in the sequence in which energizing the solenoid valve 330 causes the spool 242 in the 3-4 shift valve 240 to be moved to the right position, allowing the oil pressure to be released from the oil passage 115 while allowing the oil pressure to be introduced into the oil passage 120 so that the brake $B_0$ is released and the clutch $C_0$ is engaged.

The following gives a description of the shifting from the third to second speed and how the operation of the timing control valve according to the invention is operated in connection with the shifting.

Energizing the solenoid valve 320 causes the spool 232 in the 2-3 shift valve 230 to be moved to the left position, allowing the oil pressure to be released from the oil passage 121 while allowing the operating oil pressure $PC_2$ through the oil passage 122 in the inner piston I for the clutch $C_2$ to begin gradually to be reduced. Before the downshifting from the third to second speed is commenced, an external force expressed in the inequality (1) below is exerted on the spool 347 in the timing control valve 340, placing the spool 347 in the left position.

$$PB_2 \times A_3 + Fs \leq PL \times A_1 + PC_2(A_2 - A_1) \quad (1)$$

Then, the operating oil pressure $PC_2$ is gradually decreasing and the external force on the spol 347 reduces to such an extent as expressed in the inequal relation (2) hereinbelow, which causes the spool 347 to move to the right position, allowing the oil passages 116 and 125 to communicate with each other and thus allowng the brake $B_1$ to be engaged. The downshifting 3 to 2 then comes to completion.

$$PB_2 \times A_3 + Fs > PL \times A_1 + PC_2(A_2 - A_1) \quad (2)$$

where $A_1$, $A_2$, $A_3$, Fs and $PB_2$ remain constant.

Therefore, the value of $PC_2$ required to cause the spool 347 to move to the right position and thus the brake $B_1$ to operate is determined from the equation (3). If the pressure-applicable cross-sections of the lands (piston portions) in the valve is determined so that $A_2 - A_1 > 0$ and $A_3 - A_1 < 0$ are complied, $PB_2$ becomes equal to PL on the 3-2 downshifting.

$$PC_2 = (PB_2 A_3 - PL A_1)/(A_2 - A_1) + Fs/(A_2 - A_1) \quad (3)$$

Figure 5:
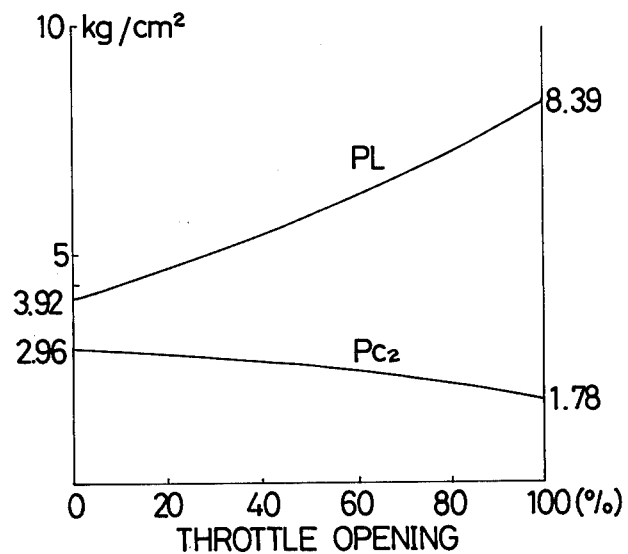
FIG. 5 is a graphical representation of variations in the operating oil pressure $PC_2$ required for shifting from the third to second speed shifting range.

As a result, the value $PC_2$ decreases in inverse proportion to the increase in the line pressure PL which occurs as the throttle opening degree increases. FIG. 5 presents the relationship between the line pressure PL and the operating oil pressure $PC_2$, which makes the equation (3) valid when PL varies from 3.92 kg/cm² to 8.39 kg/cm² according to changes in the throttle opening degree with $A_1 = 0.916$ cm², $A_2 = 1.4103$ cm² and $A_3 = 0.7854$ cm² given. As the operating oil pressure $PC_2$ necessary to cause the brake $B_1$ to be engaged decreases inversely as the throttle opening degree increases, the timing of engaging the brake $B_1$ is delayed relatively to the increasing throttle opening degree, so that the timing lag between releasing the clutch $C_2$ and engaging the brake $B_1$ can be sufficiently prolonged (i.e. enhanced) relatively to the increasing throttle opening degree.

With the manual valve 210 at the position 3, the shiftings to the first, second and third speeds are effected in the same manner as in the D position as earlier described, but the shifting to a fourth speed does not take place because a line pressure, which is introduced in the right chamber 243 of the 3-4 shift valve 240 from the oil passages 106 and 114, causes the spool 242 to be locked in the left position. If the manual valve 210 is manually operated to shift from D to 3 position while the car is running in the fourth speed (shift range) with the valve 210 at D position, the downshifting to the third speed takes place immediately.

If the manual valve 210 is placed at 2 position, a shifting to the first speed takes place in the same manner as at D position. In the second speed, the oil pressure from the oil passages 106 and 116 causes the brake $B_1$ to be engaged so as to make the engine brake work effectively. If manual shifting to 2 position takes place while the car is cruising in the third speed, the computer circuit responds to a prescribed vehicle-speed with a certain value, providing an output which energizes the solenoid valve 320 to effect a downshifting from 3 to 2.

When the manual valve 210 is shifted to L position, the oil pressure is introduced into the oil passage 109, producing a line pressure in the right oil chamber 233 of the 2-3 shift valve 230 to cause the spool 232 to be locked in the left position and thus immediately to result in a downshift from 3 to 2. The 2-1 downshifting then takes place in which the output provided by the computer circuit in response to a prescribed, lower vehicle speed disenergizes the solenoid valve 330. At the same time, the oil pressure in the oil passage 109 is introduced through the oil passage 107, the low coast modulator valve 250, and the oil passages 123 and 118 into the brake $B_3$ for engagement.

Figure 6:
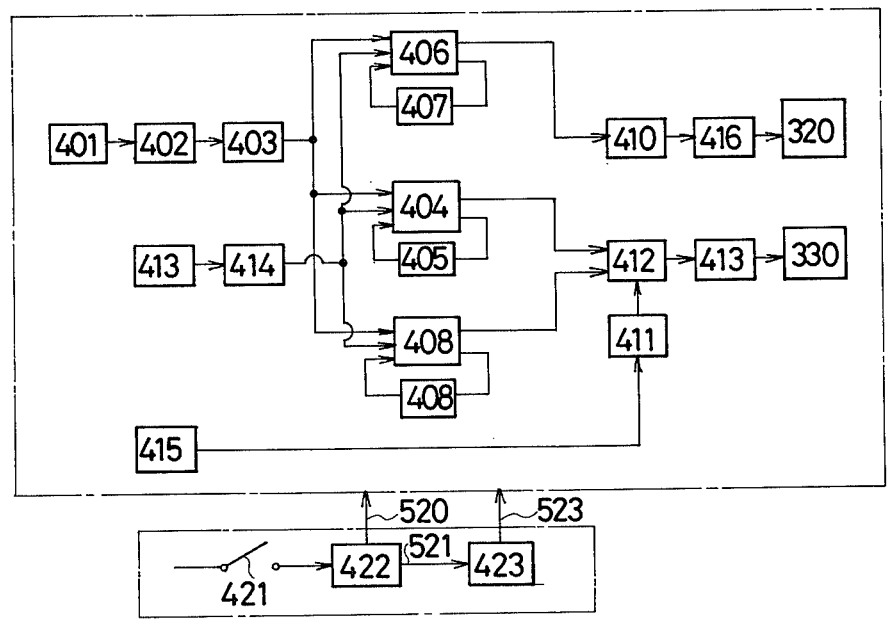
FIG. 6 is a block diagram of the electrical circuit for controlling solenoid valves as shown in FIG. 3.

The following gives a description of the electronics circuit (computer) shown in FIG. 6 which responds to changes in the vehicle running conditions for controlling the operation of the first and second solenoid valves 320 and 330 as defined in Table 3.

The electronics circuit comprises a power supply circuit 420, and a computer circuit 400 which includes vehicle-speed and throttle opening degree sensing means as an input element and a drive output element for the solenoid valves 320 and 330, including other intermediate circuit elements to later be described in detail. A switch 421 in the power supply circuit 420 is connected to an external battery (not shown) and is also connected to a position switch 422 on the manual lever 210. The position switch 422 is selectively connected through a lead wire 520 to D, 3, 2, L positioning means, and through a lead wire 521 to a power supply (constant voltage supply) 423 which provides constant voltage through a lead wire 523 to the circuit elements in the computer circuit 400.

The computer circuit arrangement comprises vehicle-speed sensor 401, reshaper with amplifier incorporated 402, D-A (digital-analog) converter 403, throttle-position switch 413, throttle opening degree voltage generator 414, 1-2 shift discriminator 404, 2-3 shift discriminator 406, 3-4 shift discriminator 408, hysteresis circuits 405, 407, 409, valve control circuit 410 for the solenoid valve 320, valve control circuit 412 for the solenoid valve 330, N-R shift signal generator 415, timer 411, amplifiers 416, 417, and solenoid valves 320, 330.

The vehicle-speed sensor 401 provides a sine curve signal in response to the vehicle speed, and the signal is fed to the reshaper 402 which reshapes it into a positive rectangular signal, which is further supplied to the D-A converter 403. The D-A converter 403 provides a D.C. voltage signal whose magnitude depends upon the vehicle speed. The throttle opening degree sensing switch (throttle position switch) 413 detects engine loads, and includes a variable resistance means which varies with the throttle opening degrees. This switch 413 provides an output signal indicative of a throttle opening degree and the signal is delivered to the throttle opening degree voltage generator 414 which further supplies a corresponding D.C. voltage. This voltage is applied to the 1-2 shift discriminator 404, 2-3 shift discriminator 406, and 3-4 shift discriminator 408, respectively. Each of the discriminators includes a differential amplifier, for example, which compares a vehicle-speed voltage signal and a throttle opening degree voltage signal to determine any one of the 102 shift, 2-3 shift and 3-4 shift. The hysteresis circuits 405, 407 and 409 provide the respective downshifting conditions corresponding to the 2-1 shift, 3-2 shift and 4-3 shift, and permit the respective downshifting to be effected at a slightly lower vehicle speed points than at the respective upshifting vehicle speed points, thereby preventing buzzing and chattering at gear shifting speed regions.

The opening control circuit 410 for solenoid valve 320 provides output signal "0" (OFF) or output signal "1" (ON) depending on the output of the 2-3 shift discriminator 406. The output of the circuit 410, which is amplified by the amplifier 416, controls the solenoid valve 320 for opening or closing depending on the output level received. The opening control circuit 412 for the solenoid valve 330 delivers an output signal "0" or an output signal "1" depending on the output of the 1-2 shift discriminator 404, the output of the 3-4 shift discriminator 408, and the output of the N-R shift signal generator 415 which is fed through the timer 411 to the circuit 412. The output of the circuit 412 is amplified by the amplifier 417 for controlling the solenoid valve 330 for opening or closing.

The timing control valve which has been described with reference to the preferred embodiments of the present invention has its operation controlled by the line pressure exerted on the spool therein and by taking advantage of the increase in the line pressure that takes place as the throttle position increases. It is therefore advantageously possible to increase the timing lag between releasing of the clutch $C_2$ and engaging the brake $B_2$ in relation to the increase in the throttle opening degree, and thus permit a smooth downshifting.

Although the invention has been described with reference to the several preferred embodiments thereof, it should be understood that various changes and modifications may be made within the scope and spirit of the invention.

What is claimed is:

1. An automatic transmission control apparatus of the type in which a shifting to one shift range is provided essentially by engaging a first friction clutch ($C_1$) and a friction brake ($B_1$) for effectuating engine braking or for aiding in the operation of a one-way clutch, said automatic transmission control apparatus including a timing control valve (340) functioning in a manner such that a shifting from a higher speed shift range to said one shift range is effectuated by causing said friction brake ($B_1$) to be engaged after releasing a second friction clutch ($C_2$) which has been in engagement at said higher speed shift range and causing said one-way clutch, if any, to be engaged, said timing control valve (340) comprising:

(a) a spool (347);
   (b) a spring (345) biasing said spool (347) in a first direction;
   (c) a first chamber (341) having a pressure-applicable area $A_1$ to which hydraulic line pressure (PL) may be supplied to bias said spool (347) in the direction counteracting the biasing force of said spring (345);
   (d) a second chamber (344) having a pressure-applicable area $A_2$ to which hydraulic pressure ($PC_2$) from said second friction clutch ($C_2$) may be supplied to bias said spool (347) in the direction counteracting the biasing force of said spring (345);
   (e) a third chamber (348) for controlling supply and release of hydraulic pressure for said friction brake ($B_1$);
   (f) a first passage (108) communicating hydraulic line pressure (PL) which is a function of engine speed to said first chamber (341);
   (g) a second passage (122) communicating hydraulic pressure ($PC_2$) from a hydraulic servo of said second friction clutch ($C_2$) to said second chamber (344); and
   (h) a third passage (116) communicating hydraulic pressure to said third chamber (348) when said spring (345) is not compressed;

whereby, when it is desired to shift from a higher speed range to said one shift range:

(i) said spool (347) is initially in a first position in which said spring (345) is compressed by hydraulic line pressure (PL) in said first chamber (341) and hydraulic pressure ($PC_2$) in said second chamber (344) and in which said third passage (116) is blocked;
   (j) release of hydraulic pressure from said hydraulic servo of said second friction clutch ($C_2$) allows the hydraulic pressure ($PC_2$) in said second chamber (344) to begin gradually reducing; and
   (k) when the hydraulic pressure ($PC_2$) in said second chamber (344) has reduced sufficiently so that the biasing force of said spring (345) exceeds the combined force exerted on said spool (347) by the hydraulic pressure in said first (341) and second (344) chambers, said spool (347) moves to a second position in which said third passage (116) communicates with said friction brake ($B_1$), the point at which the movement of said spool (347) occurs being a function of the pressure in said first chamber (341) and thus of engine speed;

2. An automatic transmission control apparatus as recited in claim 1 and further comprising a fourth passage (125) communicating said third chamber (348) to said friction brake ($B_1$).

3. An automatic transmission control apparatus as recited in claim 1 and further comprising a drain port (127') which is in communication with said third chamber (348) when said spool (347) is in its first position.

4. An automatic transmission control apparatus as recited in claim 1 wherein said third chamber (348) has a pressure-applicable area of zero at least substantially.

5. An automatic transmission control apparatus as recited in claim 1 and further comprising a solenoid valve (320) energization of which allows hydraulic pressure to be released from said second friction clutch ($C_2$), thereby allowing the hydraulic pressure ($PC_2$) in said second chamber (344) to begin gradually reducing.

6. An automatic transmission control apparatus as recited in claim 1 wherein said one shift range is the second speed shift range.

7. An automatic transmission control apparatus as recited in claim 1 wherein the pressure-applicable area $A_2$ is greater than the pressure-applicable area $A_1$.

8. An automatic transmission control apparatus of the type in which a shifting to one shift range is provided essentially by engaging a first friction clutch ($C_1$) and a friction brake ($B_1$) for effectuating engine braking or for aiding in the operation of a one-way clutch, said automatic transmission control apparatus including a timing control valve (340) functioning in a manner such that shifting from a higher speed shift range to said one shift range is effectuated by causing said friction brake ($B_1$) to be engaged after releasing a second friction clutch ($C_2$) which has been in engagement at said higher speed shift range and causing said one-way clutch, if any, to be engaged, said timing control valve (340) comprising:

(a) a spool (347) having a first position and a second position;
   (b) a spring (345) biasing said spool (347) towards its second position;
   (c) a first chamber (341) having a pressure-applicable area ($A_1$) to which hydraulic pressure (PL) may be supplied to bias said spool (347) towards its first position;

(d) a second chamber (344) having a pressure-applicable area ($A_2$) to which hydraulic pressure ($PC_2$) may be supplied to bias said spool (347) towards its first position;

(e) a third chamber (348) for controlling supply and release of hydraulic pressure for said friction brake ($B_1$);

(f) a first passage (108) communicating hydraulic pressure (PL) which is a function of engine speed to said first chamber (341);

(g) a second passage (122) communicating hydraulic pressure ($PC_2$) from a hydraulic servo of said second friction clutch ($C_2$) to said second chamber (344);

(h) a third passage (116) communicating hydraulic pressure to said third chamber (348) when said spool (347) is in its second position; and (i) a drain port (127') which is in communication with said third chamber (348) when said spool (347) is in its first position;

whereby, when it is desired to shift from a higher speed range to said one shift range:

(j) said spool (347) is initially in its first position, said spring (345) being compressed by hydraulic pressure ($PC_2$) in said second chamber (344) and hydraulic pressure (PL) in said first chamber (341), and said third passage (116) being blocked;

(k) release of hydraulic pressure from said hydraulic servo of said second friction clutch ($C_2$) allows the hydraulic pressure ($PC_2$) in said second chamber (344) to begin gradually reducing;

(l) the timing for movement of said spool (344) from its first position to its second position after said second friction clutch ($C_2$) has been released is increased in response to increasing engine speed; and (m) when the hydraulic pressure ($PC_2$) in said second chamber (344) has reduced sufficiently, said spool (347) moves to its second position, in which said third passage (116) communicates with said friction brake ($B_1$), the point at which the movement of said spool (347) occurs being a function of the pressure in said first chamber (341) and thus of engine speed.

9. An automatic transmission control apparatus as recited in claim 8 wherein the pressure-applicable area $A_2$ is greater than the pressure-applicable area $A_1$.

10. An automatic transmission control apparatus as recited in claim 8 and further comprising a fourth passage (125) communicating said third chamber (348) to said friction brake ($B_1$).

11. An automatic transmission control apparatus as recited in claim 8 wherein said chamber (348) has a pressure-applicable area of at least substantially zero.

12. An automatic transmission control apparatus as recited in claim 8 and further comprising a solenoid valve (320) energization of which allows hydraulic pressure to be released from said second friction clutch ($C_2$), thereby allowing the hydraulic pressure ($PC_2$) in said second chamber (344) to begin gradually reducing.

13. An automatic transmission control apparatus as recited in claim 8 wherein said one shift range is the second speed shift range.

14. An automatic transmission control apparatus of the type in which a shifting to one shift range is provided essentially by engaging a first friction clutch ($C_1$) and a friction brake ($B_1$) for effectuating engine braking or for aiding in the operation of a one-way clutch, said automatic transmission control apparatus including a timing control valve (340) functioning-in a manner such that a shifting from a higher speed shift range to said one shift range is effectuated by causing said friction brake ($B_1$) to be engaged after releasing a second friction clutch ($C_2$) which has been in engagement at said higher speed shift range and causing said one-way clutch, if any, to be engaged, said timing control valve (340) comprising:

(a) a spool (347) having a first position and a second position;

(b) a spring (345) biasing said spool (347) towards its second position;

(c) a first chamber (341) having a pressure-applicable area $A_1$ to which hydraulic pressure (PL) may be supplied to bias said spool (347) towards its first position;

(d) a second chamber (344) having a pressure-applicable area $A_2$ to which hydraulic pressure ($PC_2$) may be supplied to bias said spool (347) towards its first position;

(e) a third chamber (348) for controlling supply and release of hydraulic pressure for said friction brake ($B_1$);

(f) a first passage (108) communicating hydraulic pressure (PL) which is a function of engine speed to said first chamber (341);

(g) a second passage (122) communicating hydraulic pressure ($PC_2$) from a hydraulic servo of said second friction clutch ($C_2$) to said second chamber (344); and (h) a third passage (116) communicating hydraulic pressure from an intermediate coast modulation valve (225) to said third chamber (348) when said spool (347) is in its second position, whereby, when it is desired to shift from a higher speed range to said one shift range:

(i) said spool (347) is initially in its first position, said spring (345) being compressed by hydraulic pressure ($PC_2$) in said second chamber (344) and hydraulic pressure (PL) in said first chamber (341), and said third passage (116) being blocked;

(j) release of hydraulic pressure from said hydraulic servo of said second friction clutch ($C_2$) allows the hydraulic pressure ($PC_2$) in said second chamber (344) to begin gradually reducing;

(k) the timing for movement of said spool (344) from its first position to its second position after said second friction clutch ($C_2$) has been released is increased in response to increase in engine speed; and (l) when the hydraulic pressure ($PC_2$) in said second chamber (344) has reduced sufficiently, said spool (347) moves to its second position, in which said third passage (116) communicates with said friction brake ($B_1$), the point at which the movement of said spool (347) occurs being a function of the pressure in said first chamber (341) and thus of engine speed.

15. An automatic transmission control apparatus as recited in claim 14, wherein the pressure-applicable area $A_2$ is greater than the pressure-applicable area $A_1$.

16. An automatic transmission control apparatus as recited in claim 14 and further comprising a fourth passage (125) communicating said third chamber (348) to said friction brake ($B_1$).

17. An automatic transmission control apparatus as recited in claim 14 and further comprising a drain port (127') which is in communication with said third chamber (348) when said spool (347) is in its first position.

18. An automatic transmission control apparatus as recited in claim 14, wherein said third chamber (348) has a pressure-applicable area of at least substantially zero.

19. An automatic transmission control apparatus as recited in claim 14 and further comprising a solenoid valve (320) energization of which allows hydraulic pressure to be released from said second friction clutch ($C_2$), thereby allowing the hydraulic pressure ($PC_2$) in said second chamber (344) to begin gradually reducing.

20. An automatic transmission control apparatus as recited in claim 14, wherein said one shift range is the second speed shift range.

* * * * *

UNITED STATES PATENT AND TRADEMARK OFFICE
CERTIFICATE OF CORRECTION

PATENT NO. : 4,476,747

DATED : October 16, 1984

INVENTOR(S) : Kawamoto

It is certified that error appears in the above-identified patent and that said Letters Patent is hereby corrected as shown below:

In Column 9, line 9, change "spol" to --spool--.

In Column 12, line 37, change "zero at least substantially" to --at least substantially zero--.

Signed and Sealed this

Sixteenth Day of July 1985

[SEAL]

Attest:

DONALD J. QUIGG

Attesting Officer

Acting Commissioner of Patents and Trademarks